United States Patent [19]

Full et al.

[11] 4,291,382

[45] Sep. 22, 1981

[54] RELATIVE MANIFOLD VACUUM OF AN INTERNAL COMBUSTION ENGINE

[75] Inventors: Gary G. Full, Ellington; Rinaldo R. Tedeschi, Newington, both of Conn.

[73] Assignee: United Technologies Corporation, Hartford, Conn.

[21] Appl. No.: 105,803

[22] Filed: Dec. 20, 1979

[51] Int. Cl.³ .................. G01L 23/24; G06F 15/20; G01M 15/00
[52] U.S. Cl. ................... 364/551; 73/117.2; 364/558
[58] Field of Search ............ 73/115, 116, 117.2; 364/551, 431

[56] References Cited

U.S. PATENT DOCUMENTS

| | | | |
|---|---|---|---|
| 3,964,301 | 6/1976 | Hanson et al. | 73/116 |
| 4,027,532 | 6/1977 | Trussel et al. | 73/117.2 |
| 4,050,296 | 9/1977 | Benedict | 73/116 |
| 4,064,746 | 12/1977 | Mercik, Jr. et al. | 73/116 |
| 4,072,047 | 2/1978 | Reismüller | 73/115 |
| 4,125,894 | 11/1978 | Cashel et al. | 73/117.2 X |
| 4,145,746 | 3/1979 | Trussell et al. | 73/117.3 X |
| 4,179,922 | 12/1979 | Bouverie et al. | 73/116 |

Primary Examiner—Felix D. Gruber
Attorney, Agent, or Firm—Dominic J. Chiantera

[57] ABSTRACT

The instantaneous values of intake manifold vacuum in an internal combustion (IC) engine running under load are measured to provide an indication of the relative performance and relative suction ability of each cylinder in the engine. The instantaneous values of manifold vacuum are sensed at selected, sub-cyclic crankshaft angle intervals within a full engine cycle, each angle interval being substantial less than that associated with a cylinder sub-cycle, each sensed value of manifold vacuum being identified by the sensed angle position to provide an indication of the sub-cyclic fluctuations in manifold vacuum as they occur at known cylinder intake strokes within the engine cycle, thereby providing identification of each sub-cyclic fluctuation in manifold vacuum as being associated with a particular cylinder, the relative magnitudes of the manifold vacuum fluctuations providing a relative indication of each cylinder's performance and suction ability within a common engine cycle.

7 Claims, 12 Drawing Figures

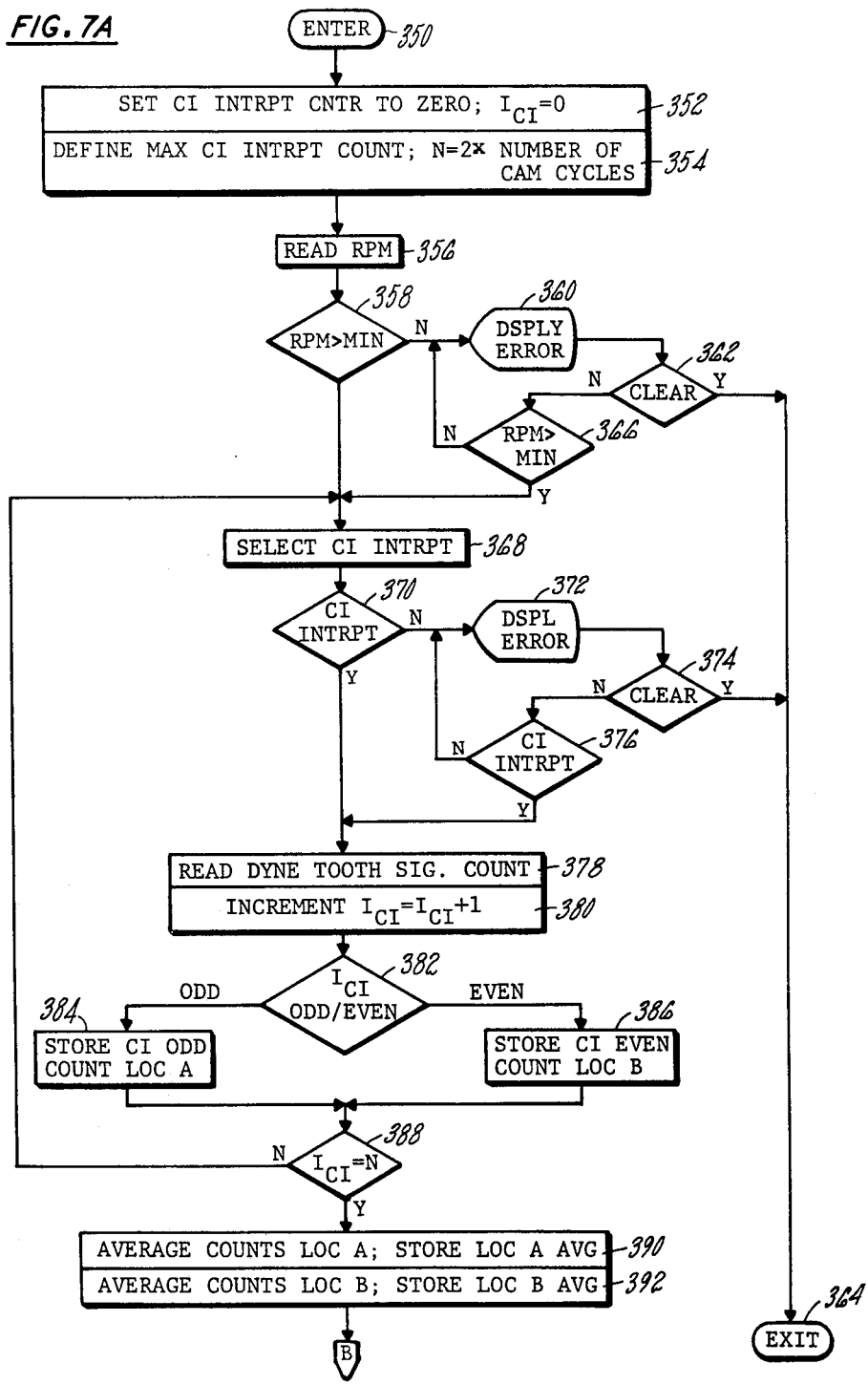

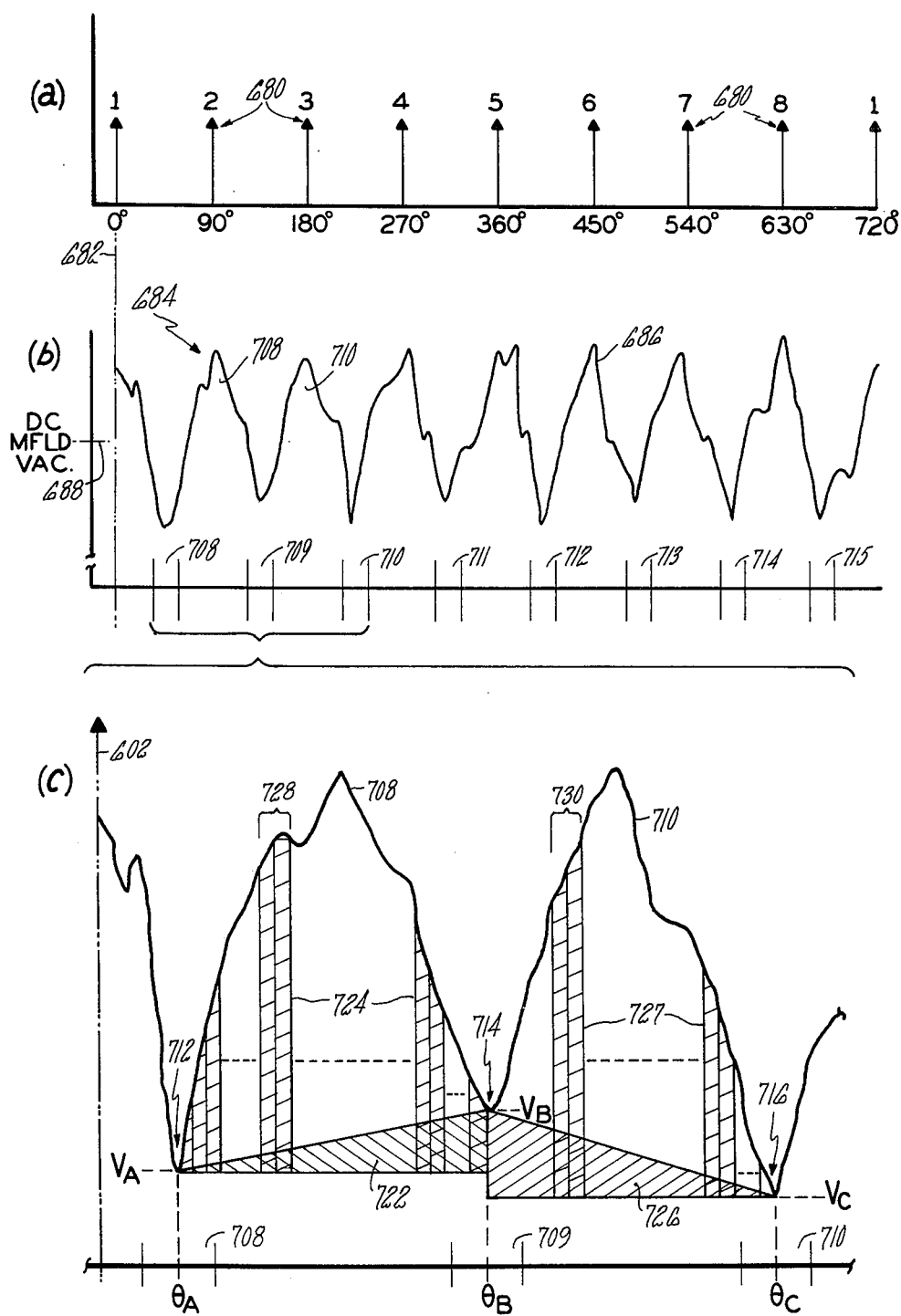

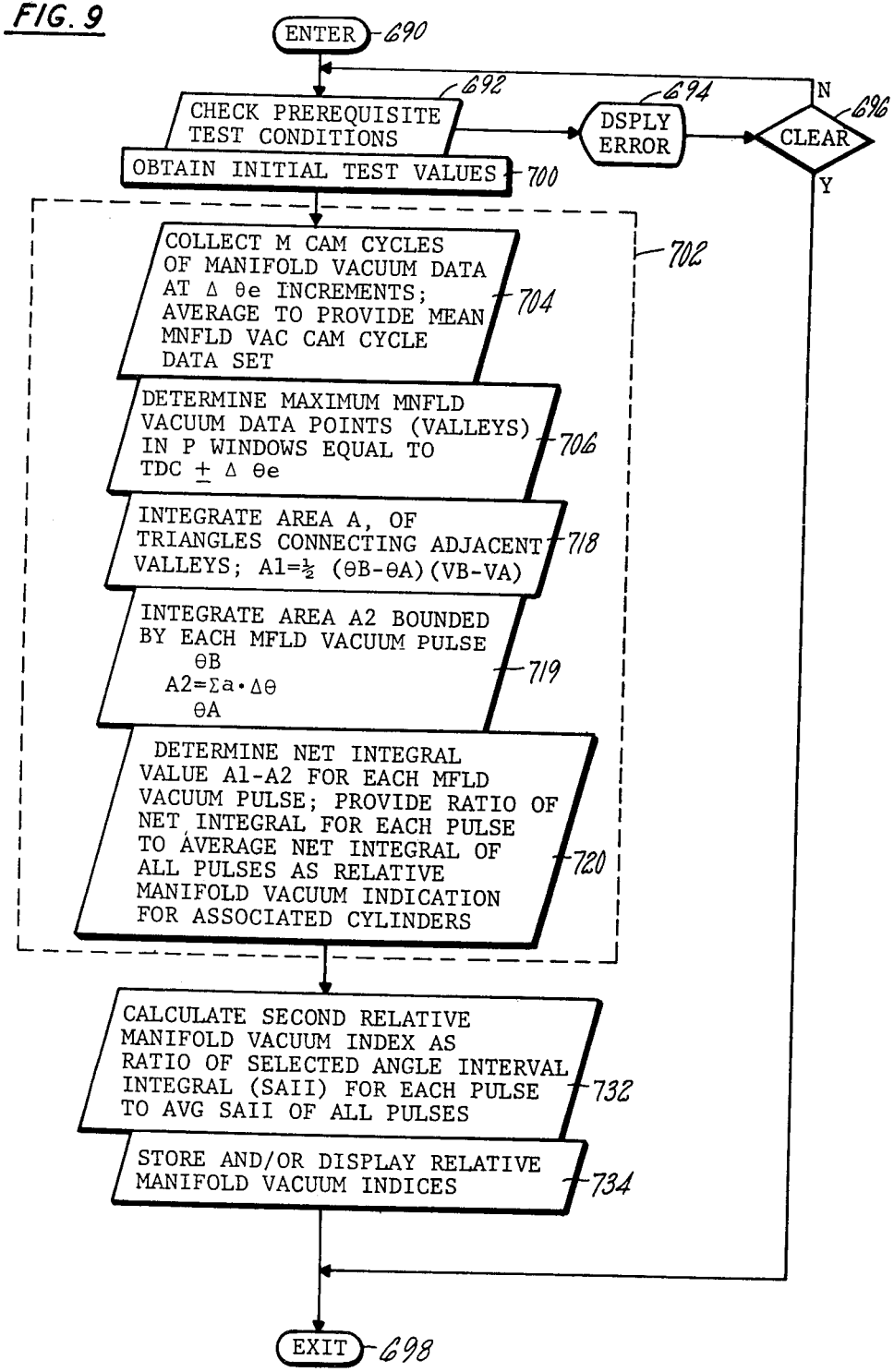

RELATIVE MANIFOLD VACUUM OF AN INTERNAL COMBUSTION ENGINE

DESCRIPTION

1. Technical Field

This invention relates to the extra-vehicular hot-testing of internal combustion (IC) engines, and more particularly to diagnosing hot-test engine performance electronically.

2. Background Art

Hot-testing of IC engines outside of a vehicle (extra-vehicular) is known generally, being used mainly in the testing of newly manufactured, production line engines and in the testing of overhauled or repaired engines. The term hot-test refers to testing the engine with ignition to determine basic dynamic engine performance. At present, the actual tests performed during the engine hot-test involve the most basic test criteria and rely almost entirely on the hot-test operator for diagnosing base-line engine performance. Although the tests may involve measurement of basic engine timing, in general the pass/fail acceptance standards are based on what the operator perceives of the engine running characteristics, such as the inability to start or to maintain engine speed, or the sound of the engine while running. These tests do provide suitable pass/fail criteria for gross engine malfunctions, however, it is impossible, except to the most experienced operator, to provide even simple diagnosis of the cause of the engine poor performance.

In the first instance, the inability to provide quantitative measurements of engine performance and acceptance, results in the acceptance or marginal engines in which the actual failure occurs sometime later as an infant mortality, perhaps after installation in the vehicle. Conversely, the rejection of an engine based on the present qualitative standards may be unwarranted in many instances, resulting in the unnecessary recycling of the engine through some type of repair facility, where with more extensive testing the apparent fault may be corrected with a minor engine adjustment. Therefore, it is desirable to establish an accurate quantitative analysis testing procedure which with measurement of selected engine parameters may provide for accurate pass/fail determination.

In general, the present state of the art of IC engine diagnostics includes the use of a number of different measurable engine parameters, which in one way or the other are useful in providing information as to engine performance. One such engine parameter which has been found useful to measure is manifold vacuum which provides an indication of the integrity of the engine's air induction system, and is useful in the detection of cylinder fauls. At present, however, the techniques for measuring manifold vacuum provide only the full cycle or average values of vacuum, such that its use is essentially limited to providing an indication of the existence or non-existence of a fault. This as opposed to providing an indication of how well an engine performs which would be useful in detecting imminent engine failure.

CROSS-REFERENCE TO RELATED APPLICATIONS

Some of the matter disclosed and claimed herein is also disclosed in one or more of the following commonly owned, copending U.S. patent applications filed on even date herewith by: Full et al, Ser. No. 105,446, entitled RELATIVE EXHAUST BACK-PRESSURE OF AN INTERNAL COMBUSTION ENGINE; Tedeschi et al, Ser. No. 105,448, entitled SNAP ACCELERATION TEST FOR AN INTERNAL COMBUSTION ENGINE; and Full et al, Ser. No. 105,447, entitled RELATIVE POWER CONTRIBUTION OF AN INTERNAL COMBUSTION ENGINE.

DISCLOSURE OF INVENTION

The object of the present invention is to use the instantaneous values of the intake manifold vacuum of an IC engine to provide an indication of the relative performance of the engine cylinders. Another object of the present invention is to detect the relative suction ability of each cylinder.

According to the present invention the instantaneous values of manifold vacuum are sensed at selected sub-cyclic angular intervals within a full engine cam cycle, each interval being substantially less than that associated with a particular cylinder's intake stroke, each sensed data value being identified by the cam cycle position at which it was sensed to provide an indication of the sub-cyclic fluctuations in manifold vacuum as they occur at known cylinder intake strokes within the cam cycle to further provide identification of each sub-cyclic fluctuation in manifold vacuum as being associated with a particular cylinder, the relative magnitude of the manifold vacuum fluctuations being an indication of the associated cylinder's relative performance. In further accord with the present invention, the magnitude of each sub-cyclic fluctuation in manifold vacuum is provided by integrating the instantaneous vacuum values with respect to crankshaft angle to provide an indication of the net area bounded by a waveform composite of the instantaneous values of each fluctuation, the net integral area values for each fluctuation being compared with the average net area integral values of all fluctuation to provide a relative indication of each cylinder's suction ability.

The relative manifold vacuum test of the present invention uses the instantaneous values of manifold vacuum to provide a dynamic performance indicator of the relative balance between engine cylinders. The measurement of the contribution of each cylinder to the sub-cyclic fluctuations in manifold vacuum provide a sensitive indicator of engine performance, or imbalance, thereby providing a quantitative standard from which subtle engine faults or potential faults may be detected. These and other objects, features and advantages of the present invention will become more apparent in light of the detailed description of a best mode embodiment thereof, as illustrated in the accompanying drawing.

BRIEF DESCRIPTION OF DRAWING

FIG. 8, including a–c, is an illustration of a set of waveforms characterizing one aspect of the dynamic performance of an IC engine, which is used in the description of the present invention; and FIG. 9 is a simplified logic flowchart diagram illustrating the relative manifold vacuum test of the present invention, as performed in the control system of FIG. 2.

BEST MODE FOR CARRYING OUT THE INVENTION

Figure 1:
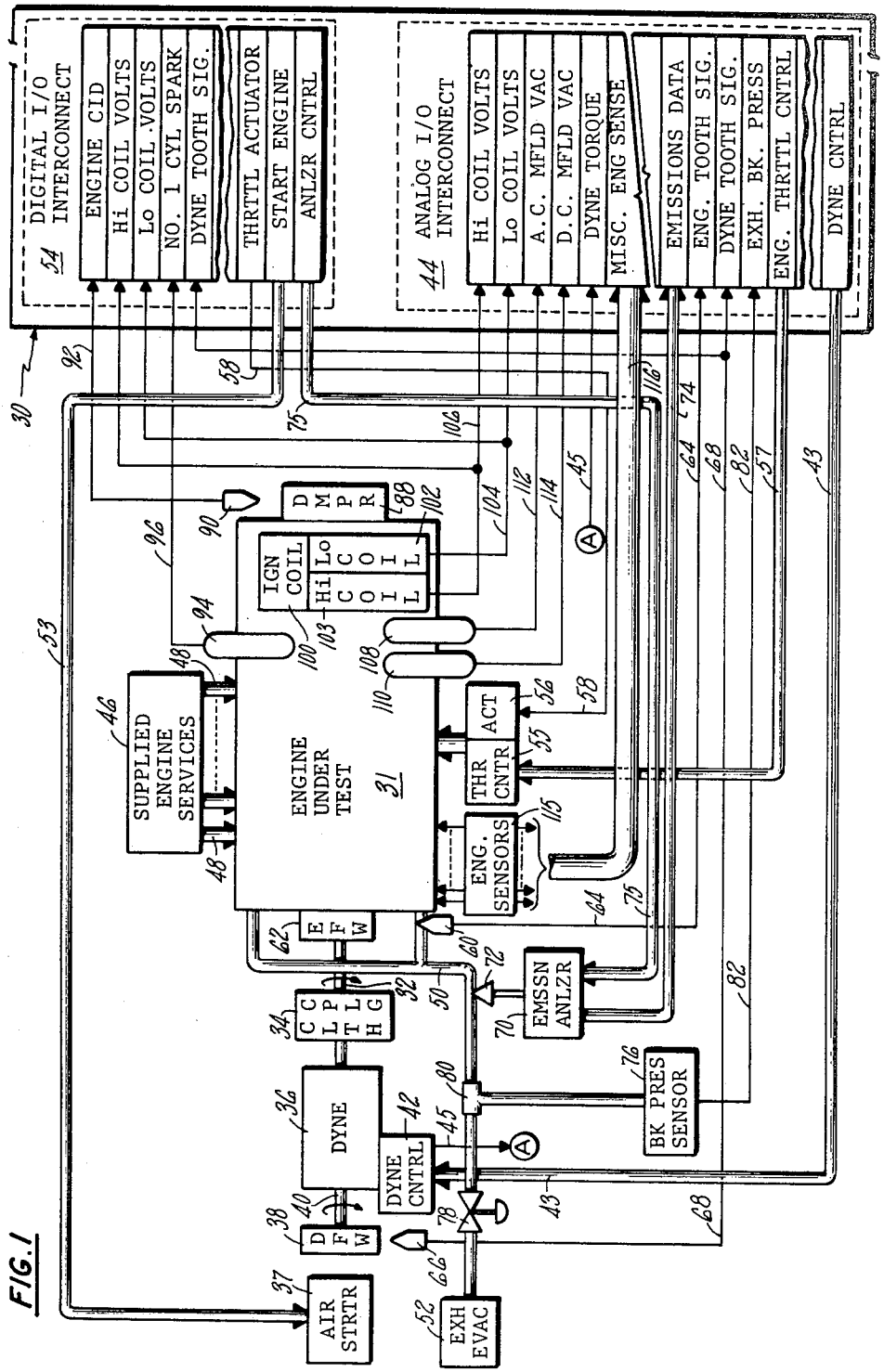
FIG. 1 is a schematic block diagram illustration of the instrumentation in a typical engine hot-test installation in which the present invention may be used.

Referring to FIG. 1, in a simplified illustration of an engine hot-test installation in which the present invention may be used, a test control system 30 receives sensed engine data from the test engine 31 which is mounted in a test stand (not shown) and loaded by connection of the engine crankshaft 32 through a coupling assembly 34 to an engine load, such as a brake mechanism or, as illustrated, a dynamometer (dyne) load 36. The dyne is known type, such as the Go-Power Systems model D357 water dynamometer, equipped with an air starter 37. The air starter is used to crank the test engine (through the dyne) in the absence of an engine mounted starter. A dyne flywheel 38, connected to the dyne shaft 40, includes a ring-gear (not shown) having a selected number of precision machined gear teeth equally spaced around the circumference of the ring-gear so that the tooth-to-tooth intervals define substantially equal increments of dyne shaft angle. Dyne control circuitry 42 controls the dyne load torque (Ft-Lb) to a set point torque reference signal provided on lines 43 from the analog interconnect 44 of the control system 30, by controlling the amount of water in the dyne drum (not illustrated in FIG. 1). The dyne control circuitry also provides a sensed, actual dyne torque signal on a line 45 to the analog interconnect of the control system.

The test engine is provided with the engine services 46 necessary for engine operation, such as fuel, oil, and water, etc. through service connections 48. The engine exhaust manifolds are connected through exhaust line 50 to an exhaust evacuating pump 52. Following engine start-up in response to a "start engine" discrete signal presented on lines 53 to the starter 37 (or engine starter if available) from the control system digital interconnect 54, an engine throttle control 55 and associated throttle control actuator 56 control the engine speed (RPM) to an engine RPM reference set point signal provided to the control on lines 57 from the analog interconnect. In addition, the actuator receives a discrete signal from the digital interconnect 54 on a line 58, which is used to provide snap acceleration of the engine as described hereinafter. In summary, the test engine under hot-test is operated under controlled load at selected engine speed profiles to permit the dynamic analysis of the engine base-line parameters and the engine diagnostic routines described hereinafter.

The hot-test sequence examines engine base-line parameters related to speed, exhaust emissions, ignition cycle timing, and spark duration to determine engine health, i.e., output power and combustion efficiency. The speed measurements include engine crankshaft speed (RPM) and dyne shaft speed. The indication of engine crankshaft speed may be provided by any type of rotational speed sensing device, such as a shaft encoder, or preferably a magnetic pick-up sensor 60, such as Electro Corp. RGT model 3010-AN Magnetic Proximity Sensor, which senses the passage of the teeth of the engine ring-gear mounted on the engine flywheel 62 and provides an engine series tooth pulse signal on the line 64 to the analog interconnect. The actual number of ring-gear teeth depends on the particular engine model with 128 teeth being average. The teeth are uniformly spaced around the circumference of the ring gear, such that 128 teeth provide tooth-to-tooth spacing corresponding to a crankshaft angle interval of 2.813 degrees. This is adequate for marking subcyclic cylinder events within the ignition cycle, but due to the variation of total tooth count with different engine models it may be preferred to provide the crankshaft angle resolution required by the control system from the load speed indication. The load speed may also be sensed with a shaft encoder or by sensing the teeth of the dyne ring-gear which has a tooth count typically twice that of the engine ring-gear, or 256 teeth for the 128-tooth engine ring-gear. This is provided by a proximity sensor 66, similar to the sensor 60, which senses the passage of the dyne ring-gear teeth to provide a dyne series tooth pulse signal on line 68 to the analog interconnect. The precision edging of the dyne teeth allows for exact resolution on the leading and trailing edges of each of the tooth pulse signals which permits (as described in detail hereinafter) edge detection of each to provide an equivalent 512 dyne tooth intervals per crankshaft revolution.

Engine exhaust measurements include both exhaust gas analysis and exhaust back-pressure measurements. The emissions analysis measures the hydrocarbon (HC) and carbon monoxide (CO) constituents of the exhaust with an emissions analyzer 70, of a type known in the art such as the Beckman model 864 infrared analyzer. The analyzer is connected to the exhaust pipe 50 through an emissions probe 72. The HC and CO concentration is determined by the differential measurement of the absorption of infrared energy in the exhaust gas sample. Specifically, within the analyzer two equal energy infrared beams are directed through two optical calls; a flow through exhaust gas sample cell and a sealed reference cell. The analyzer measures the difference between the amounts of infrared energy absorbed in the two cells and provides, through lines 74 to the control system analog interconnect, HC and CO concentrations as DC signals with full scale corresponding typically to: (1) a full-scale HC reading of 1000 PPM, and (2) a full-scale CO of 10%. The analyzer operating modes are controlled by control signal discretes provided on lines 75 from the digital interconnect. The exhaust back-pressure instrumentation includes a back-pressure sensor 76, such as a Viatran model 21815 with a range of ±5 PSIG, and a back-pressure valve 78, such as a Pacific Valve Co. model 8-8552. The pressure sensor is connected to the exhaust line 50 with a tap joint 80 and provides a signal indicative of exhaust back-pressure on line 82 to the analog interconnect. The back-pressure valve simulates the exhaust system load normally provided by the engine muffler and is typically a manually adjustable 2" gate valve with a range of 15 turns between full open and full closed.

The engine ignition timing information is derived from the crankshaft angle information provided by the dyne and engine ring-gear teeth and by sensing a crankshaft index (CI), such as the timing marker on the engine damper 88. The CI is sensed with a magnetic pick-up sensor 90, such as the Electro Corp. Model 4947 proximity switch, which preferably is mounted through a hole provided on the damper housing and measures the passage of the timing marker notch on the damper. The sensor mounting hole is at a known crankshaft angle value from the top dead center (TDC) position of the #1 cylinder, and is determined from the engine specifications. The notch triggers a signal pulse by passing near the CI sensor every crankshaft revolution and the CI pulses are provided on lines 92 to the control system digital interconnect. In addition, the ignition cycle information includes measurement of the #1 cylinder sparkplug firing which in combination with the CI sensor indication provides a crankshaft synchronization point corresponding to the TDC of the #1 cylinder power stroke. The spark firing is sensed by a clamp-on Hall effect sensor 94 which provides a voltage signal pulse coincident with the sparkplug firing on a line 96 to the digital interconnect.

The sparkplug signal duration measurements are provided by measuring the primary (Lo Coil) and secondary (Hi Coil) voltage signals of the engine ignition coil 100. The Lo Coil voltage is sensed by a connection 102 to the primary of the coil and the Hi Coil voltage is measured with a sensor 103, such as a Tektronix Model P6015 high-voltage probe with a range of 0 to 50 KV. The signals are provided on lines 104, 106 to both interconnects of the control system.

In addition to sensing engine speed, exhaust, ignition timing and spark duration parameters, the intake manifold vacuum pressure is also sensed. Two vacuum measurements are made; a DC manifold vacuum which provides the average vacuum level, and an AC manifold vacuum which provides instantaneous values of vacuum. The AC measurements are made by inserting a pressure sensor 108, such as a VIATRAN Model 218 with a range of ±1 PSIG, in the engine vacuum line connected to the PCV valve. The DC manifold vacuum sensor 110 may be a VIATRAN Model 218 with a range of ±15 PSIG inserted in the same vacuum line. Each sensor provides a voltage signal indicative of the sensed pressure on lines 112, 114 to the control system. Additional engine sensors 115, such as pressure and temperature of the engine oil, fuel, water, etc. are provided to the control system through lines 116. The sensors provide the information on the necessary prerequisite engine ambient conditions which must be established prior to test, as discussed in detail hereinafter.

Figure 2:
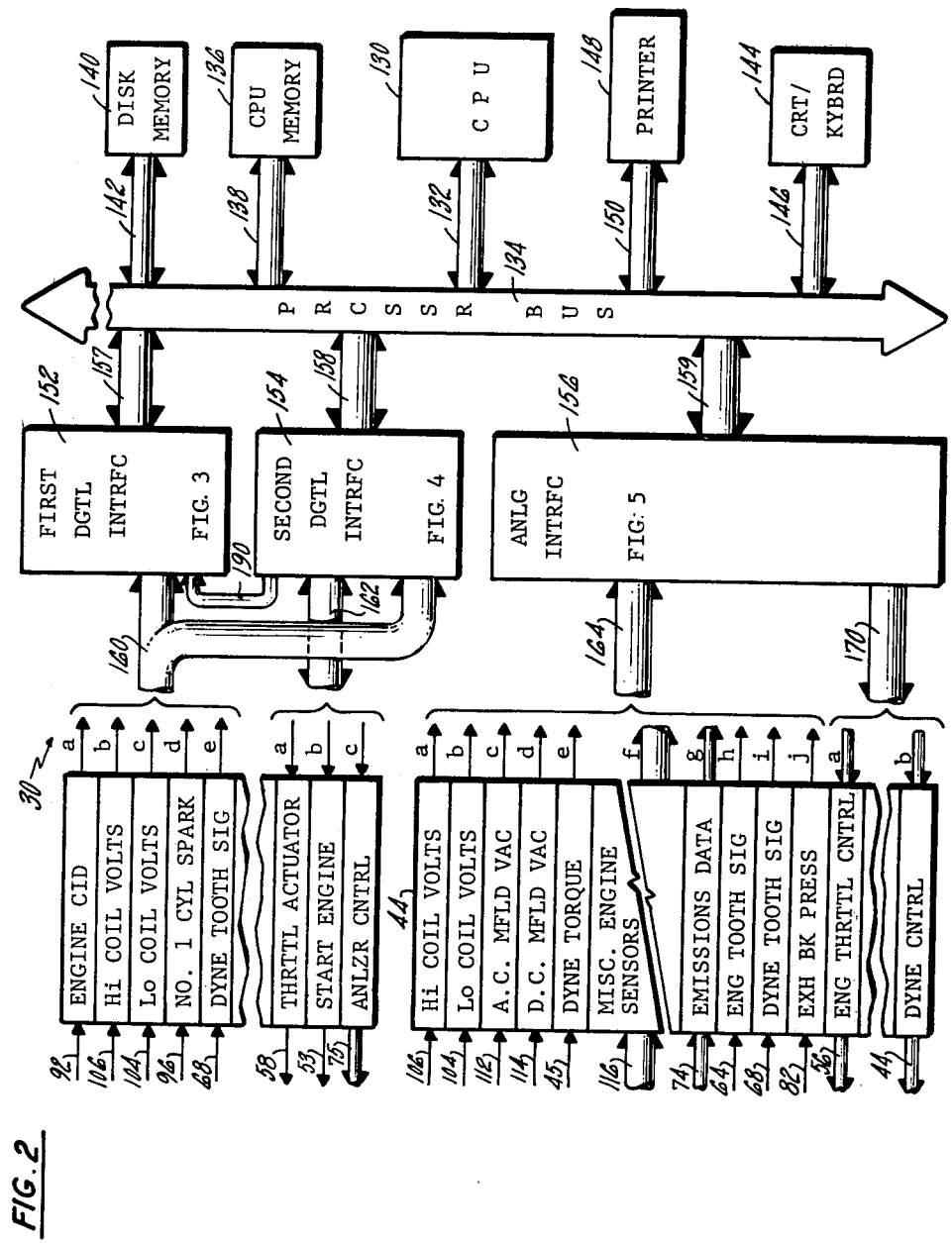
FIG. 2 is a system block diagram of a hot-test control system which may incorporate the present invention.

With the test engine connected to the load dyne 36 and instrumented as shown in FIG. 1, the hot-test control system automatically programs the start-up (cranking), ignition, and running of the engine at prescribed engine speed (RPM) and engine load conditions. Referring now to FIG. 2, a hot-test control system 30 which may incorporate the present invention includes a central processing unit (CPU) 130 which preferably is a known, proprietary model general purpose computer, such as the Digital Equipment Corporation (DEC) Model PDP-11/34 minicomputer which may be used with a software data system based on the DEC RSX11-M multi-task real time software package. The size of the CPU depends on the data processing tasks of the system, so that depending on the hot-test system requirements, a smaller microcomputer, such as the DEC LSI-11, may be used for the CPU. Similarly, a number of smaller CPUs may be used, each dedicated to a particular aspect or function of the system. The selection of the particular type of CPU to be used is one which may be made by those skilled in the art, based on system through-put requirements. It should be understood, however, that selection of the particular type of CPU is dependent on overall hot-test requirements alone, and forms no part of the present invention. If it is considered necessary, or practical, any one of a number of known processing systems and softward packages may be used as may be obvious or readily apparent to those skilled in the art.

As known, the CPU includes general purpose registers that perform a variety of functions and serve as accumulators, index registers, etc. with two dedicated for use as a stack pointer (the locations, or address of the last entry in the stack or memory) and a program counter which is used for addressing purposes and which always contains the address of the next instruction to be executed by the CPU. The register operations are internal to the CPU and do not require bus cycles. The CPU also includes: an arithmetic logic unit (ALU), a control logic unit, a processor status register, and a read only memory (ROM) that holds the CPU source code, diagnostic routines for verifying CPU operation, and bootstrap loader programs for starting up the system. The CPU is connected through input/output (I/O) lines 132 to a processor data bus 134 which includes both control lines and data/address lines and functions as the interface between the CPU, the associated memory 136 which is connected through I/O lines 138 to the data bus, and the peripheral devices including user equipment.

The memory 136 is typically nonvolatile, and may be either a core memory, or preferably a metallic oxide semiconductor (MOS) memory with battery backup to maintain MOS memory contents during power interruption. The MOS memory may comprise one or more basic MOS memory units, such as the DEC MOS memory unit MS11-JP each having 16 K words of memory location, as determined by system requirements. The memory is partitioned into several areas by the system application software, as described hereinafter, to provide both read only, and read/write capability.

The peripheral devices used with the CPU and memory, other than the user interface devices, may include: (1) a disk memory loader 140, such as a DEC Pac Disk Control unit with two disk drives, connected through I/O lines 142 to the bus, (2) a CRT/keyboard terminal 144, such as DEC ADDS model 980, connected through I/O lines 146 to the bus, and (3) a printer 148, such as the DEC LA 35 printer, connected through I/O lines 150. The printer and disk loader are options, the disk memory loader being used to store bulk engine data or specific test routine instructions on floppy disks, which may then be fetched by the CPU. Alternatively, the specific test routines may be stored in the memory 136 such that the disk memory loader is used to store only bulk data.

The CRT/keyboard unit provides man-machine interface with the control system which allows an operator to input information into, or retrieve information from the system. These man-machine programs may include general command functions used to start, stop, hold, or clear various test routines, or to alter engine speed or dyne torque set point values for the engine throttle and dyne control circuitry. In addition, a specific "log-on" procedure allows the operator to alter the engine specification data stored in a data common portion of the memory 136.

The user interfaces include first and second digital interfaces 152, 154, and analog interface 156, connected through I/O lines 157-159 to the processor bus. Each digital interface receives the sensed engine data from the digital I/O interconnect 54 on lines 160. The digital interface 154 provides the required control system output discrete signals to the test engine instrumentation through lines 162 to the digital I/O interconnect. The sensed engine data presented to the analog I/O interconnect 44 is presented through lines 164 to the analog interface which provides the control system set point reference signals for the engine throttle and dyne control circuitry on lines 170 back to the analog interconnect.

In the operation of the CPU 130 and memory 136 under the application software for the system, the memory is partitioned into a number of different areas, each related to a different functional aspect of the application software. As used here, the term application software refers to the general structure and collection of a coordinated set of software routines whose primary purpose is the management of system resources for control of, and assistance to, the independently executable test programs described individually hereinafter. The three major areas of the memory include: (1) a library area for storing a collection of commonly used subroutines, (2) a data common area which functions as a scratch pad and which is accessible by other programs in memory which require scratchpad storage, and (3) a general data acquisition program area which includes routines for: collecting raw data from the user interfaces and storing the raw data in data common, deriving scaled, floating point data from the raw data, and a safety monitor subroutine which monitors some of the incoming data for abnormal engine conditions such as engine overspeed, low oil pressure, and excessive engine block temperature. In addition to the three main program areas, a further partition may be provided for a test sequencer program which functions as a supervisory control of the engine hot-test sequence of operations.

The data common area is partitioned into subregions for: (1) storing the sensed raw data from the user interfaces, (2) storing scaled data derived from the stored sensed data by use of selected conversion coefficients, (3) storing engine model specifications such as number of cylinders, firing order, CI sensor mounting hole angle, number of ring-gear teeth, etc., and (4) storing a description of the desired test plan (a list of test numbers).

The areas in memory dedicated to the various test plans stored in data common (4) include a test module partition in which the engine tests requested by the test sequencer program are stored during execution of the test. The tests stored represent separately built program test routines executed during hot-test, that have a name format "TSTXXX" where XXX is a three-digit number. The test routines themselves are stored either in a further partition of the memory 136 or, if optioned, stored on floppy disks and read into the test module partition from the disk driver.

Each CPU instruction involves one or more bus cycles in which the CPU fetches an instruction or data from the memory 136 at the location addressed by the program counter. The arithmetic operations performed by the ALU can be performed from: one general register to another which involves operations internal to the CPU and do not require bus cycles (except for instruction fetch), or from one memory location or peripheral device to another, or between memory locations of a peripheral device register and a CPU general register; all of which require some number of bus cycles.

In the control system embodiment of FIG. 2, a combination interrupt/noninterrupt mode of operation is selected, although if desired, total noninterrupt may be used with further dedicated programming. The digital interfaces 152, 154 establish the processor interrupt mode of operation in which the CPU reads particular sensed engine data from the analog interface in response to specific events occurring within each engine cycle. The interrupt mode includes several submodes in which the CPU is directed to read specific input parameters, or combinations of parameters, depending upon the selected test. Each of the interrupts have an associated vectored address which directs the CPU to the particular input channels, or the locations in memory associated with the particular analog channel. These vectored interrupts are used to cause the CPU to read at the particular selected interrupt time: (a) engine cam angle alone, (b) cam angle and one or more analog channels, (c) one or more analog channels without cam angle, and (d) the spark duration counter (described hereinafter with respect to FIG. 4). In the absence of interrupts, i.e., the noninterrupt mode of operation, the CPU reads the data provided at the analog interface continuously as a stand alone device. In this noninterrupt mode, the sample sequence and sample time interval, typically one second, is ordered by the general data acquisition routine which stores the raw data in the memory data common location.

The interface 152 provides the interrupts required to synchronize the CPU data acquisition to specific, selected events within the engine cycle. This is provided by synchronizing the CPU interrupts to crankshaft angle position by: (1) sensing instantaneous crankshaft angle position from the dyne tooth signal information, and (2) detecting the crankshaft synchronization point (the TDC of the #1 cylinder power stroke) by sensing the CI signal from the CI sensor (90, FIG. 1) together with the number one cylinder firing as provided by the spark sensor (94, FIG. 1), as described hereinafter. With the crankshaft index marking the beginning of each engine cycle, the dyne tooth signal provides information on the instantaneous crankshaft angle position from this crankshaft synchronization point, such that the entire ignition cycle may be mapped. As a result, cam cycle and subcyclic information related to specific cylinder events within the ignition cycle may be accurately tagged as corresponding to known crankshaft angle displacement from the synchronization point. The interface 152 then interrupts the processor at predetermined locations within the engine cycle, each identified by a particular crankshaft angle value stored in the memory 136 and associated with with a particular engine cycle event. In addition, the interface 152 also provides CPU interrupt for: (1) the presence of number one cylinder spark ignition pulse, (2) the rising edge of the Lo coil voltage signal (which indicates the availability of the KV voltage to fire the sparkplug), (3) the CI signal, and (4) a discrete SPARK DURATION DATA READY signal provided from the digital interface 154 (described hereinafter with respect to FIG. 4).

Figure 3:
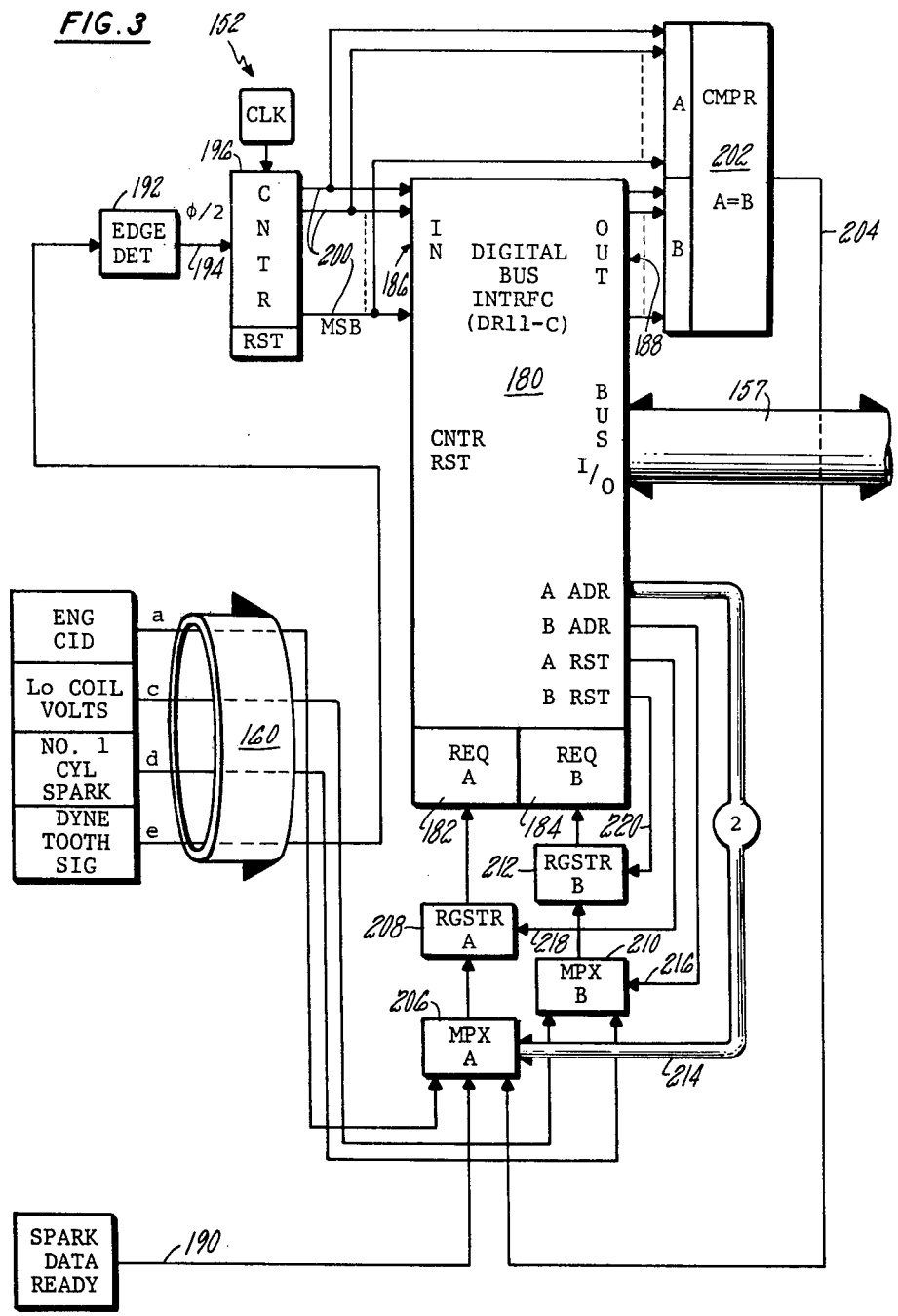
FIG. 3 is a system block diagram illustration of one subsystem as may be used in the control system embodiment of FIG. 2.

Referring now to FIG. 3, the interface 152 includes a general purpose, parallel in/out bus interface 180, such as the DEC DR11-C, which interfaces the processor bus 134 to the signal conditioning circuitry illustrated. As known, the DR11-C includes a control status register, and input and output buffer registers, and provides three functions including: (1) address selection logic for detecting interface selection by the CPU, the register to be used, and whether an input or output transfer is to be performed, and (2) control logic which permits the interface to gain bus control (issue a bus requests) and perform program interrupts to specific vector addresses. The interrupts are serviced at two inputs of the bus interface, REQ A input 182, and REQ B input 184. Each input responds to a discrete presented to the input and, in the presence of such a discrete, generates the bus request and interrupt to the CPU over the bus I/O line 157. The interface also includes 16 pin user input and output connections 186, 188 for data transfer between the signal conditioning circuitry and the processor.

The interface 152 receives: the engine CI, the Lo-Coil signal, the number one cylinder spark ignition signal, and the dyne raw tooth signal on lines 160 from the digital interconnect 54, and the SPARK DATA READY signal on a line 190 from the interface 154. The dyne tooth signal is presented to an edge detection circuitry 192 which detects the rising and falling edges of each raw dyne tooth pulse and provides a signal pulse for each, resulting in a doubling of the frequency, i.e., X 2 pulse count for each camshaft cycle (engine cycle). The conditioned dyne tooth signal is presented on an output line 194 as a series pulse signal at a frequency twice that of the raw tooth signal. For a dyne tooth count of 256 teeth the conditioned tooth signal provides 512 pulses per crankshaft revolution; each pulse-to-pulse interval defines a crankshaft angle increment equal to 360°/512, or 0.703°. Since each camshaft cycle is equal to two crankshaft revolutions, or 720°, the camshaft angle measurement revolution provided by the conditioned tooth signal is better than 0.1%.

The conditioned dyne tooth signal on the line 194 is presented to a ten bit counter 196 which counts the conditioned tooth signal pulses and provides a 10 bit binary count on lines 200 to the input 186 of the digital interface 180. The counter 196 provides a continuous count of the tooth pulses, continuously overflowing and starting a new 10-bit count. The count output from the counter 196 is also presented to one input (A) of a comparator 202 which receives at a second input (B) a 10-bit signal from the user output 188. The comparator provides a signal discrete on an output line 204 in response to the condition A=B.

The CI signal, the SPARK DATA READY signal, and the output of the comparator 202 on the line 204, are presented to the input of a multiplexer (MPX) 206, the output of which is presented to a buffer register 208. The Lo-coil voltage signal and the number one cylinder spark signal are each presented to a second MPX 210, the output of which is connected to a second buffer register 212. The outputs of the registers 208, 212 are connected to the interrupt inputs 182, 184 of the bus interface. The signal select function provided by the MPX's 206, 210 is controlled by address signals from the CPU on the bus interface output lines 214, 216. The address signals select the inputs called for by the CPU depending on the particular test routine or engine condition to be monitored at the particular time. The interface 180 also provides reset discretes for the registers 208, 212 on lines 218, 220 following the receipt of the buffered discrete at the interrupt inputs.

In operation, the control system acquires camshaft synchronization by having the CPU provide a SELECT CI address signal on lines 214 to the MPX 206. The next appearing CI signal is steered into the register 208 and read at the input 182. The interface generates a bus request and an interrupt back through the data bus to the CPU, which when ready, responds to the interrupt by reading the counter output on the lines 200. The count value is stored in data common. The CPU processes a number of CI interrupts, each time reading the counter output. The ten bit counter provides alternating high and low counts on successive CI interrupts, corresponding to TDC of the power stroke and intake stroke of each engine cycle. Typically, the count samples at alternate interrupts are averaged to provide two average count signals corresponding to the two interrupts in each cycle. The CPU next requests the number one cylinder spark discrete by outputting a READ NO. 1 SPARK address signal on the line 216 to the MPX 210. In response to each spark signal interrupt, the CPU reads the output of the counter 196. Since the spark discrete signal appears only once in each engine cycle, as opposed to the twice appearing CI signal, the count corresponding to the spark discrete is compared to the two averaged count signals for the CI interrupt. The CI count closest to that of the spark count is selected as the CI corresponding to the number one cylinder power stroke. The CI sensor crankshaft angle displacement from true TDC is read from memory and the equivalent angle count is added to the selected CI count ($CI_p$) to provide the crankshaft synch point count which is stored in memory. The difference count between the spark count and synch point count represents the engine timing angle value, which is also stored in memory. The subroutines for camshaft synchronization are described hereinafter with respect to FIG. 7.

With the engine cam cycle defined by the stored count in memory the CPU may specify particular camshaft angles at which it desires to read some of the engine sensed parameters. This is provided by reading the desired cam angle value from the memory 136 to the output 188 of the interface 180, i.e., the B input of the comparator 202. In response to the count on the lines 200 from the counter 196 being equal to the referenced count, the comparator provides a discrete to the MPX 206, which is addressed to the comparator output by the appropriate "SELECT COMPARATOR" address on the lines 214. This interrupt is serviced in the same way providing a vectored address to the CPU and steering it to the particular one of the analog input channels.

Figure 4:
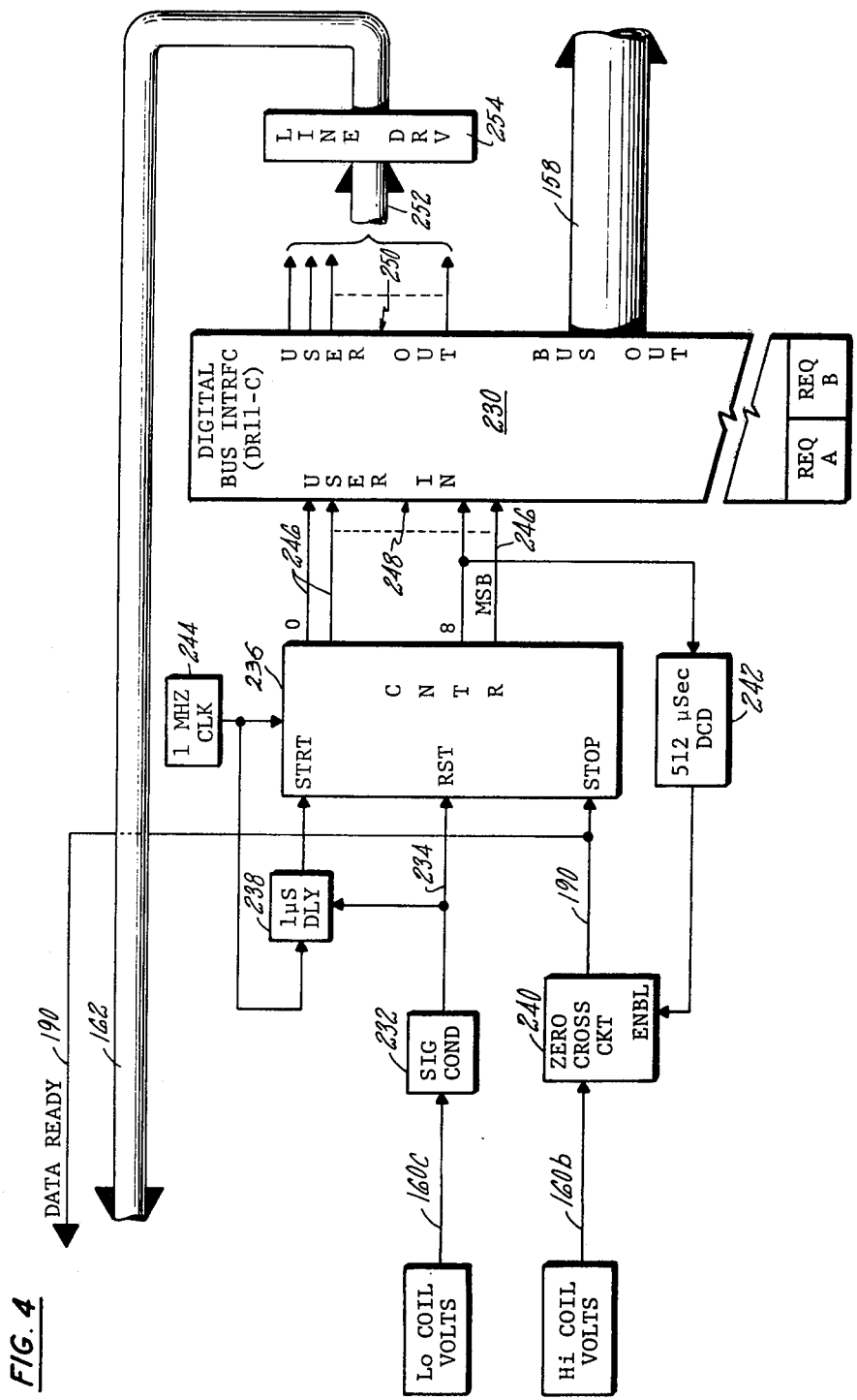
FIG. 4 is a system block diagram illustration of another subsystem as may be used in the control system embodiment of FIG. 2.

Referring now to FIG. 4, the digital interface 154 also includes a digital bus interface 230, such as a DR11-C. The interface 154 receives the sensed engine discrete signals including the Hi-coil and Lo-coil voltage signals on lines 160. The Lo-coil signal is presented to signal conditioning circuitry 232 which squares up the leading edge of the signal and provides the conditioned signal on a line 234 to the reset (RST) input of a twelve bit counter 236 and to the enable (ENBL) input of a one-shot monostable 238. The Hi-coil signal is presented to a zero crossover circuit 240 which when enabled provides the SPARK DATA READY signal on the line 190 in response to the presence of a zero amplitude, i.e., crossover of the Hi-coil signal.

As described hereinafter with respect to the sparkplug load tests, each Hi-coil voltage signal which is representative of successive sparkplug voltage signals includes an initial KV peak voltage followed by a plateau representative of the actual plug firing interval. The peak KV portion is followed by a ringing of the waveform which, in some instances, may be detected by the zero crossover circuit as a true crossover, therefore, the crossover circuit is enabled only after a selected time interval following the leading edge of the Lo-coil signal. The enable is provided by a decode circuit 242 which senses the output of the counter 236 and in response to a count greater than that corresponding to a selected time interval, typically 512 microseconds, provides an enable gate to the zero crossover circuit. The SPARK DATA READY discrete from the zero crossover circuit is provided both to the input of the digital interface 152 and to a stop (STP) input of the counter 236. A one megahertz signal from a clock 244 is presented to the count input of the counter 236 and to the input of the monostable 238, the output of which is presented to the start (STRT) input of the counter.

The counter functions as an interval timer and provides an indication of the time interval between the Lo-coil leading edge and the Hi-coil zero crossover which corresponds to the time duration of the sparkplug voltage signal. In operation, the leading edge of the conditioned Lo-coil signal resets the counter and triggers the monostable which, following a prescribed delay (typically one clock period) starts the counter which then counts the one megahertz clock pulses. In response to a lines 246 count greater than 512, the decode 242 provides the enable to the zero crossover circuit. At the Hi-coil crossover, the crossover circuit provides the SPARK DATA READY discrete on the line 190, which stops the counter and if selected by the CPU, interrupts the CPU via the digital interface 152. The interrupt causes the CPU to read the count at input 248 of the bus interface as an indication of the time duration of the sparkplug firing voltage. Typically, this sparkplug duration count is read continuously by the CPU, which with the synchronization to the camshaft angle identifies each sparkplug signal with its associated cylinder.

The bus interface 230 also provides at a user output 250 the digital discrete signals corresponding to the START ENGINE signal, and the discrete signals associated with the throttle actuator (56, FIG. 1) and with control of the emissions analyzer (70 FIG. 1). These discrete enable signals to the analyzer include flush, sample, drain, and sample intake commands which cause the analyzer to function in a program, all of which is known in the art. All of the discretes are presented through output lines 252 to line drivers 254, the output of which is presented through the lines 162 to the digital interconnect 54.

Figure 5:
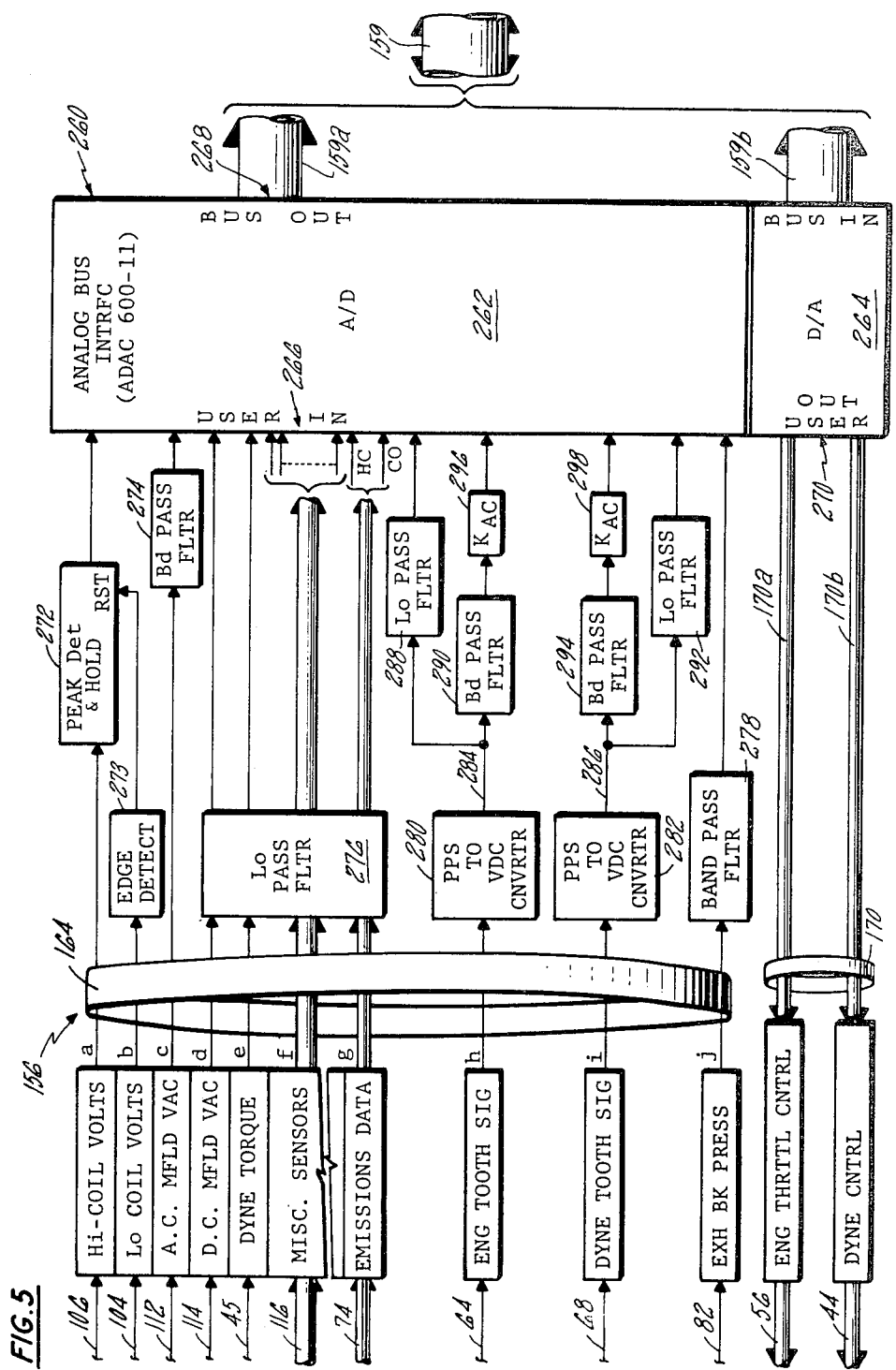
FIG. 5 is a system block diagram illustration of still another subsystem as may be used in the control system embodiment of FIG. 2.

Referring now to FIG. 5, the analog interface 156 includes an analog bus interface 260, such as the DEC model ADAC600-11, having input/output sections 262, 264. The input section includes a series of data acquisition channels connected to a user input 266, and an analog-to-digital (A/D) converter for providing the digital binary equivalent of each sensed analog parameter through the bus output 268 and lines 159a to the processor bus. The output section includes a digital-to-analog (D/A) converter which receives the CPU output signals to the engine on lines 159b and provides the analog signal equivalent of each at a user output 270. The CPU output signals include: the setpoint reference signals for the engine throttle control and the torque setpoint reference signal for the dyne control all included within the lines 170 to the analog interconnect.

The sensed engine signals presented to the analog interface are signal conditioned prior to input to the bus interface. The Hi-coil voltage signal on line $164_a$ is presented to a peak detector 272 which samples and holds the peak KV value of the signal, and this sampled peak value is presented to the bus interface. The peak detector is resetable by an engine event discrete, such as the trailing edge of low coil from the Lo-coil signal conditioner 273 in the interface 156. The AC manifold signal is presented through a band pass filter 274 to the bus interface. The limits of the band pass filter are selected in dependence on the number of engine cylinders and the range of engine test speeds. The DC manifold vacuum signal, the dyne torque signal, the miscellaneous sensed signals including engine oil, water and fuel temperatures and pressures, and the emissions data (lines $164_{d-g}$) are coupled to the bus interface through low pass filters 276 which reject any spurious noise interference on the signal lines. The exhaust back-pressure sense signal on a line $164_j$ is presented to a band pass filter 278 prior to presentation to the bus interface, with the limits selected based on the particular engine and speed range.

The engine raw tooth signal and the dyne raw tooth signal on the lines $164_{h,i}$ are presented to associated frequency to DC converters 280, 282. The output signals from the converters, which include DC and AC components of the tooth signals, are provided on lines 284, 286 to associated band-pass and low-pass filters. The converted engine tooth signal is presented to low pass filter 288 and band-pass filter 290, and the converted dyne tooth signal is presented to low-pass filter 292 and band-pass filter 294. The DC signals from the low-pass filters 288, 292 provide the DC, or average engine speed ($N_{av}$) for the engine and load, and are presented directly to the bus interface. The AC signal outputs from the band-pass filters, whose limits are selected based on the same considerations given for filters 274, 278, are presented through AC amplifiers 296, 298 to the associated channels of the input interface 262 as the indications of the instantaneous, or AC speed (N) of engine and load.

Figure 6:
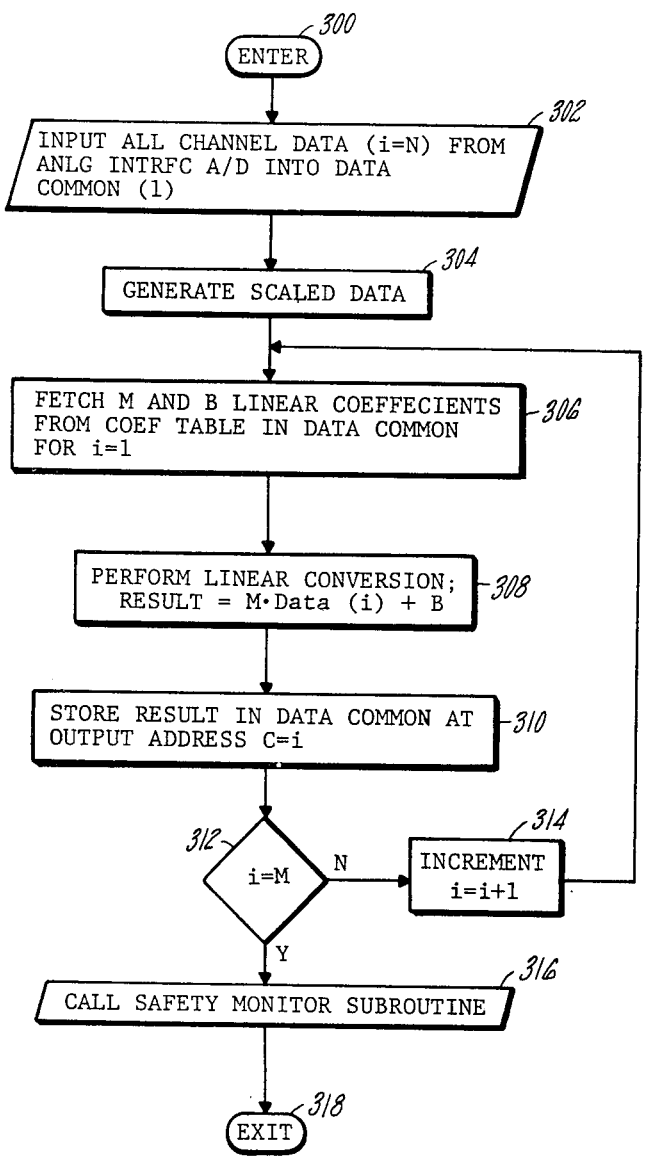
FIG. 6 is a simplified logic flowchart diagram illustrating one functional aspect of the control system of FIG. 2.

As described hereinbefore, the general data acquisition routine collects the data from the analog bus interface 260 at a prescribed sample cycle, typically once per second. The raw data is stored in one section of the data common partition of the memory 136 and a data acquisition subroutine generates a set of scaled data from the raw data using linear conversion coefficients stored in a coefficient table in memory. This second set of data is a properly scaled set of floating point numbers and is used primarily by the dynamic data display programs (for display on the CRT, FIG. 2) and for particular test subroutines which require slow speed data). In addition, the general data acquisition routine may also execute a safety monitor subroutine which checks for overtemperature of the engine block and also low engine pressure limits. Referring now to FIG. 6, in a simplified flow chart illustration of the general data acquisition routine the CPU enters the flow chart following terminal interrupt 300 and executes the subroutine 302 which requires the sampling of all A/D data channels (i=N) from the analog bus interface (260, FIG. 5). The raw data read from the A/D is stored in data common. Following the raw data acquisition subroutine 304 calls for providing a scaled set of data from that sampled in 302. This begins with process 306 which requests the CPU to fetch the linear coefficients (M,B) associated with the particular data channel (i=N) from a coefficient table in data common. Process 308 request the linear conversion of the raw data to the scaled result, after which instructions 310 call for storage of the scaled data in data common at an address C=i. Decision 312 determines if the last conversion was also the last channel (i=N) and if NO then instructions 314 requests an increment of the CPU address counter to the next address and the conversion subroutine in again repeated for each of the raw data values. Following the completion of the linear conversion subroutines (YES to decision 312) the safety monitor subroutine 316 is executed.

All of the engine test routines acquire initial value data relating to load speed and torque as well as engine timing and crankshaft synchronization prior to taking the particular test routine engine data. The analog values relating to load speed and torque are obtained under the general acquisition routine. The engine timing and crankshaft synchronization is obtained under a separate subroutine. Referring now to FIG. 7, which is a simplified flowchart illustration of a preferred engine timing and synchronization subroutine, the CPU enters the subroutine at 350 (FIG. 7A) and instructions 352 request the CPU to set the crankshaft index (CI) interrupt counter at zero. Instructions 354 request a max. CI interrupt count of N which is equal to twice the number of desired cam cycles of data (M) since the crankshaft index sensor (90, FIG. 1) provides two pulses in each cam cycle. Instructions 356 next request the read of average engine RPM from data common. Decision 358 determines if the actual engine speed is above a minimum speed required to insure valid data. If NO, instructions 360 display an error on the CRT, (144, FIG. 2) followed by decision 362 which determines if an operator entered CLEAR has been made. If there is a CLEAR of the test then the CPU exits the subroutine at 364. In the absence of an operator CLEAR the CPU waits in a loop for the minimum speed condition to be established. This is provided by decision 366 which determines if the latest RPM is greater than minimum, and if NO then continues to display the error and look for a CLEAR in 360, 362. Once the minimum RPM has been exceeded, instructions 368 request the CPU to select CI INTRPT which results in the address select to the MPX 206 of the digital interface 152 (FIG. 3) which monitors the CI pulse signal provided on a line $160_a$.

Decision 370 monitors the CI interrupt and in the absence of an interrupt displays an error in instructions 372, and looks for an operator CLEAR in instructions 374. If a CLEAR is entered the CPU exits at 364, and if no CLEAR then decision 376 monitors the presence of a CI interrupt. Following a CI interrupt instruction 378 requests a read of the dyne tooth signal count provided by the counter 196 (FIG. 3). The CPU increments the interrupt counter in instructions 380 to mark the dyne tooth count and decision 382 determines if the present interrupt is odd or even. If odd the count is stored at location A and if even it is stored at location B (instructions 384, 386). Decision 388 next determines if the interrupt is at the max count N and if not then branches back to instructions 368 to set up the next CI interrupt data acquisition. If the maximum number of interrupts have been serviced instructions 390 and 392 request the averaging of all the stored count data in each of the locations A, B to provide an average A count and an average B count.

Figure 7B:
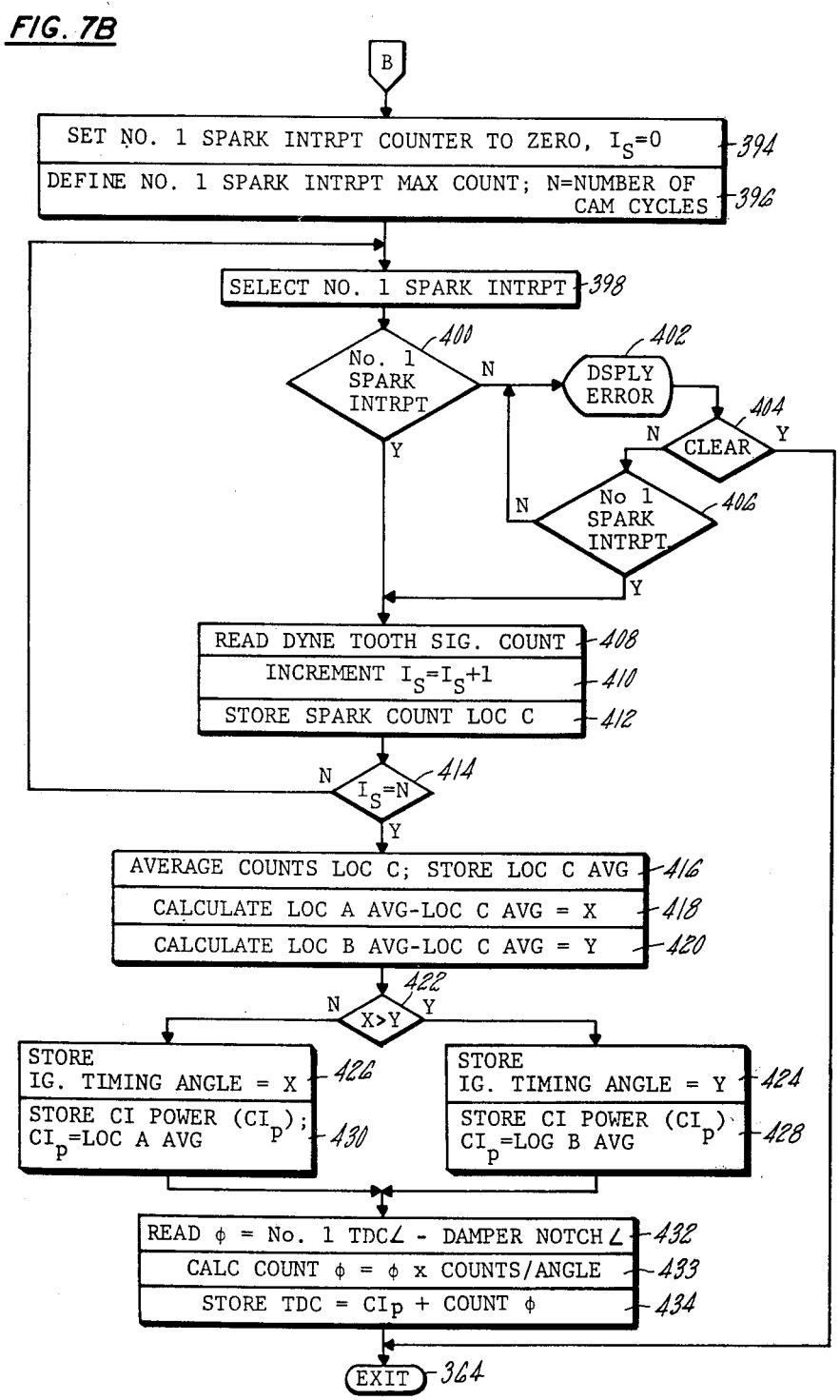
FIG. 7 A and B taken together are a simplified logic flowchart diagram illustrating one function of the present invention as performed by the control system of FIG. 2.

The CPU must identify which of the two interrupts occurring within the cam cycle is associated with the TDC of the #1 cylinder power stroke. This is provided by an acquiring the cam angle data associated with #1 cylinder spark ignition. In FIG. 7B, instructions 394 set the #1 spark interrupt to zero and instructions 396 define the max spark interrupt count as M equal to the number of cam cycles of data to be acquired. The CPU then executes the subroutine to determine the cam angle position corresponding to the #1 spark ignition. This begins with instructions 398 to select a NO. 1 SPARK INTRPT. The decision 400 looks for the presence of a spark interrupt an if no interrupt appears within a predetermined time interval the CPU again goes into a waiting loop which begins with the display of an error in 402 and the monitoring of an operator entered CLEAR in decision 404. If an operator clears entered the CPU exits the subroutine at 364. If no CLEAR, then the presence of a spark interrupt is continuously monitored in instructions 406.

Following a spark interrupt, instructions 408 read the dyne tooth signal count. Instructions 410 increment the spark interrupt counter by one and instructions 412 call for the storage of the spark count value at location C. Decision 414 determines if this is the last spark interrupt to be serviced, and if not the CPU branches back to instructions 398 to set up for the next interrupt data read. Following the requested number of interrupts, instructions 416 request the averaging of all the count stored at location C to provide a C average count value.

With this information available, the CI interrupt associated with TDC of the power stroke can be determined by comparing the two CI counts (odd/even) to the spark interrupt count. This is provided in instructions 418 et seq which first calls for calculating the difference (X) between the average A and the average C counts. Instructions 420 request the determination of the count difference (Y) between the B average and the C average counts. Decision 422 compares the X and Y counts to determine which is the largest. If the X count is larger, than instructions 424 store the Y difference count as that representative of the engine timing angle value. Similarly, instructions 426 call for storing the X count as the engine timing angle if it is the smaller of the two count differences. Instructions 428, 430 request the CPU store of the crankshaft index power ($CI_p$) as being equal to the count of the B average, or the A average, respectively. In other words, the particular one of the two counts received in the CI interrupt closest to the count corresponding to the spark interrupt is then considered to be the $CI_p$ of #1 cylinder. Instructions 432 request the CPU to read the angle ($\phi$) defined by the engine manufacturer for the particular engine which represents the angular displacement between the mounting hole for the CI sensor in the damper housing and the instantaneous position of the damper notch at true TDC of #1 cylinder. Instructions 433 next request the equivalent count value associated with the displacement angle, and instructions 434 request the calculation of the cam cycle synchronization point, or true TDC of #1 cylinder power stroke, as the sum of the crankshaft index of the power stroke plus the count increment associated with the displacement angle. Following instruction 434, the CPU exits the program at 364.

With the CPU synchronization to the engine crankshaft, the sensed engine data at the analog interface 158 (FIG. 2) may be sensed at any selected crankshaft angle increment, down to the 0.7 degree resolution provided by the conditioned dyne tooth signal to the interface 152. The particular selection of angle increment depends on the resolution accuracy required of the measured data, or the frequency of data change with crankshaft angle. Typically, the selected angle increments may be three or four times greater than the achievable angle resolution, the limitation due primarily to the processor overhead time, i.e., the inability of the processor to gain access to and process the data within the equivalent real time associated with the 0.7 degree crank angle interval. In general, each test routine includes its own, dedicated data acquisition subroutine for the particular parameter of interest. The various tests read out the slower engine speed data from data common, as provided by the general data acquisition routine. This slower data includes, among others, the sensed miscellaneous sensors (115, FIG. 1) data relating to oil and water temperatures, the choke position, and the average speed and load torque values, as may be necessary to determine if the engine prequisite conditions have been established prior to test.

The description thus far has been of a hot-test installation and control system which is capable of providing a number of different automated tests for determining the performance of the test engine. The instrumentation described with respect to FIG. 1, and the control system of FIGS. 2–5 together with the description of the application software including the general data acquisition, are illustrative of that required for a hot-test system capable of providing such a number of different performance tests. The present invention may be incorporated in such a system; its use and implementation in such a system, as described in detail hereinafter, represents the best mode for carrying out the invention. It should be understood, however, that the invention may be implemented in a simpler system which includes the engine load, but which includes only that sensing, signal conditioning, and signal processing apparatus required for direct support of the invention.

In the present invention a quantitative measurement of IC engine performance is provided by comparison of each cylinder's contribution to the sub-cyclic fluctuations in the engine's manifold vacuum; each cyinder's contribution being compared with each of the other cylinders to provide an indication of relative performance, or balance therebetween. The present invention may be used to test any type of IC engine, either as a single standard for measuring engine performance, or together with other test procedures in a hot-test system such as that described with respect to FIGS. 1 through 5.

The relative manifold vacuum test of the present invention provides a performance index of both the basic integrity of the engine air induction system and also a performance index of the relative suction ability of each engine cylinder. The air induction system integrity is provided by full cycle, or average value manifold vacuum. The relative suction balance between cylinders is provided by measuring each cylinder's contribution to the sub-cyclic fluctuations in manifold vacuum about the average vacuum value. The instantaneous values of manifold vacuum are acquired by the CPU at selected, equal crankshaft angle intervals, each angle interval being substantially smaller than that associated with a cylinder sub-cycle. The CPU acquires the instantaneous values of manifold vacuum in the interrupt mode following the CPU to engine crankshaft synchronization as provided by the synchronization routine described hereinbefore with respect to FIG. 7. In this manner each vacuum pulse fluctuation may be associated with a particular one of the engine cylinders and by magnitude comparison of each cylinder's contribution a relative performance index for the cylinders may be provided.

Referring now to FIG. 8, illustration (a) represents one engine cam cycle for a four-cycle, eight-cylinder engine. The cam cycle is equal to two crankshaft revolutions, or 720°. The vectors 680 represent the TDC position of the engine cylinder power strokes as they appear at 90° crankshaft angle intervals within the engine cam cycle. The vectors are numbered 1 through 8 corresponding to their position in the firing order from the synchronization point 682 obtained from the CPU to crankshaft synchronization subroutine of FIG. 7. The numbers have no relationship to the cylinder location or identification in the engine block itself. With the synchronization point identified, the control system maps the full cam cycle of 720° with the nominally anticipated power stroke TDC positions for each cylinder.

With the map of anticipated cam cycle TDC positions, the CPU acquires the instantaneous values of manifold vacuum at successive equal crankshaft angle increments within the cam cycle, using the interrupt mode in which the digital interface (152, FIG. 3) interrupts at each angle interval selected by the CPU by comparing the selected angle value with the actual angle value provided by the instantaneous count values of the conditioned dyne tooth signal. The waveform 684 of illustration (b) represents a composite of typical instantaneous manifold vacuum values obtained by the control system over one cam cycle, as referenced to the cam cycle of illustration (a). The instantaneous value includes the sub-cyclic fluctuations 686 (AC) of manifold vacuum about the average of DC manifold vacuum value 688. The instantaneous manifold vacuum data is obtained from the engine through the AC and DC manifold vacuum sensors 108, 110 (FIG. 1) which provide the sensed vacuum values on lines 112, 114 to the analog interconnect 44. In the present embodiment it is assumed that two separate vacuum sensors are used, however, a single sensor may be used in combination with AC coupling circuitry which segregates the AC and DC components. In the present embodiment the manifold sensors are inserted into the engine vacuum line normally connected to the PCV valve which, during manifold vacuum testing, is blocked with a manually operated valve to prevent any flow from the PCV valve into the intake manifold. This removes any effect on the manifold vacuum sensed signal due to pressure variations in the engine crankcase, and creates a stiffer, more responsive system for measuring intake manifold system performance.

Referring now to FIG. 9, in a simplified flowchart illustration of the relative manifold vacuum test of the present invention, as used in the control system of FIG. 2, the CPU enters the flowchart at interrupt 690 and first executes subroutine 692 to determine if the prerequisite engine test conditions have been established. The prerequisite conditions relate to verifying that the actual values of load torque and engine speed are at their setpoint values, and to ensuring that the engine has achieved thermostat control. The engine test speed and load torque value (Ft-Lb) are selected to maximize the work required of each cylinder, thereby creating higher peak-to-peak fluctuations in the sub-cyclic speed and enhancing the sub-cyclic manifold vacuum fluctuations obtained for relative vacuum analysis. In general this maximizing of cylinder work occurs at lower engine speeds in combination with higher load torque values. Of course the values of speed and load are engine dependent. For the assumed 8-cylinder engine typical values may be an engine test speed of 1200 RPM and a load torque of 75 Ft-Lb. Prior to beginning the manifold vacuum test the selected test speed and load torque values are read out of the test plan in memory and provided through the analog interconnect to the engine throttle and dyne controls (55, 42, FIG. 1) to establish the setpoint control limits for each. Thermostat control is established by sensing the engine coolant and oil temperatures from the miscellaneous sensors (115, FIG. 1). Failure to achieve prerequisite conditions results in instructions 694 displaying an error on the CRT (144, FIG. 2) and decision 696 determines whether or not an operator-entered CLEAR has been made. If YES the CPU exits at 698, and if NO then branches back to instructions 692. Following establishment of the prerequisite conditions instructions 700 request initial test condition parameters to be read from data common. These parameters which may include average engine speed, load torque and engine timing values only provide an information log of the actual conditions of the test to permit later identification of the indicated relative manifold vacuum results with the particular engine ambient conditions. As such, although the instructions 700 data is preferred, it is not necessary for conducting the relative manifold vacuum test of the present invention.

Following instructions 700 the CPU performs the relative manifold vacuum test routine 702. This begins with subroutine 704 which requests one or more (M) cam cycles of instantaneous manifold vacuum values, each measured at selected, equal crankshaft angle intervals. The interrupt mode established by the interface 152 is used to cause the CPU to read the manifold vacuum data to the analog bus interface for each selected crankshaft angle interrupt. The crankshaft angle interrupts define equal angle intervals over each cam cycle; the actual selection of the angle value depends on the anticipated data fluctuations and also on the desired resolution. Since there is a high ambient noise level in the engine environment it may be preferred to select an interval value which is two or more times greater than the available resolution value. The actual count values associated with each crankshaft angle value within the cam cycle are established based on the information obtained from the crankshaft synchronization subroutine of FIG. 7. For an M number of cam cycles of manifold vacuum data, the subroutine provides averaging of all of the acquired cam cycle data sets to provide a mean manifold vacuum cam cycle data set, thereby eliminating cycle-to-cycle variation.

Following acquisition of the cam cycle data set of instantaneous manifold vacuum, the instantaneous values of each fluctuation, or vacuum pulse, are integrated with respect to crankshaft angle over the net vacuum pulse area. The resultant integral value for each pulse is then used as the relative indication of cylinder performance; the particular vacuum pulse fluctuation being readily indentified with the particular cylinder contributing to the pulse fluctuation by the location of the pulse within the cam cycle and knowledge of the engine firing order. The first step in providing the integration of the pulses is to first determine the limits of integration as defined by the crankshaft angle position of the valleys (min pressure) which delineate each vacuum pulse. This is provided with subroutine 706 which request the CPU to determine the valley locations within a preselected number of "windows". Each window defines a preselected cam cycle location in terms of crankshaft angle with a selected $\pm\Delta\theta e°$ tolerance. The tolerance accounts for variations, or phase shifting of the actual sensed manifold vacuum data from the nominally anticipated location along the cam cycle. These phase shift variations occur from both the system tolerances, and also from the variations in propagation delays of the vacuum pressure wavefront within the manifold. Although the propagation delay is small, it is nevertheless present, such that some variations do occur between engines of the same type and as a result of change in ambient conditions.

Referring again to FIG. 8 illustration (b) which illustrates the cam cycle valley windows 708–715 in which the CPU searches for the minimum instantaneous pressure value. As indicated there are eight of the valley windows, one for each cylinder, each established around the locations within the cam cycle at which the nominally anticipated valley should occur for a normal engine. Since the sub-cyclic fluctuations in manifold vacuum occur only as a result of the opening of the individual cylinder's intake valves which is a definite controlled cyclic phenomena occurring at definite cam cycle intervals, the sub-cyclic fluctuations in manifold vacuum should result in the min pressure (peak vacuum) valleys occurring at essentially repeatable locations within the cam cycle. By providing a fixed number and fixed location of the valley windows based on the nominally expected location and number of engine cylinders, the absence of a detectable valley is itself indicative of an engine fault. The subroutine searches for each valley by differentiating between successive sensed data values within each window. The minimum data value within the window and the crankshaft angle at which it occurs are stored in memory.

Following acquisition of the valley locations, the CPU performs two types of integral calculations on each of the vacuum pulses. This is required to provide an accurate first order approximation of the area associated with each pulse due to the characteristic distortion of the vacuum waveform and the variations in magnitude of the vacuum at the valleys, as evident in the composite manifold vacuum waveform of FIG. 8 illustration (b). In illustration (c) is an expanded portion of illustration (b) which includes only the first two full vacuum pulses 708, 710 of the composite waveform 686. As shown the width of the pulse 708 is defined by the valleys 712, 714, whereas the width of the pulse 710 is defined by valleys 714 and 716. It is assumed that each valley occurred within the associated cam cycle valley window 708 through 710. The valley positional angle and vacuum value as obtained in subroutine 706, are illustrated for the valleys 712 through 716 by the corresponding vacuum (V) and angle ($\theta$) values shown. In FIG. 9, the subroutines 718 through 720 determine the full area integration value as the difference, or net value, between two integrals performed on each pressure pulse in the data set. Subroutine 718 integrates the area of the triangle formed by the sensed valley data of magnitude and angle position, such that for the pulse 708 the subroutine calculates the area of the triangle 722 as: $A_1 = \frac{1}{2} (\theta_B - \theta_A)(V_B - V_A)$. Subroutine 719 next performs an integration over the fixed angular locations of the pulse waveform regardless of its shape. For the pulse 708 the integration limits are: $\theta A$, $\theta B$ and the integration is performed in G number of equal integral (a) slices 724 beginning with the minimum pressure value ($V_A$), to provide the second integral $A_2 = \Sigma a_+ + \ldots a_G$. Subroutine 720 provides the performance index for the particular cylinder as the net integral value equal to the difference areas $A_1-A_2$. These integral values are taken for each of the pressure pulses of the manifold vacuum data set, i.e. for the pulse 710 the area $A_1$ of the triangle 726 is $A_1 = \frac{1}{2} (\theta_C - \theta_B)(V_C - V_B)$ and $A_2$ is the summation of the integral slices 727, thereby providing a net integral value for each. The individual cylinder net integral values are then compared in a ratio to the average of all the cylinder net integral values to provide the relative manifold vacuum indication.

The ratio values obtained from the subroutine 720 for each cylinder provide the primary performance index for the cylinders which detects the relative suctionability of the cylinders in addition to providing a general overall indication of performance. In addition to obtaining the net integral value representative of the full area beneath each pressure pulse, optional subroutine 732 provides for integration of each pulse over selected portions of the pulse as determined by selected cam cycle angle intervals within the total cam portion of the waveform. The particular limits selected being based on knowledge of a given engine model characteristics which may indicate a sensitivity to a given area of the pressure pulse. Such that FIG. 8, illustration (c) some number of integral slices less than the G number taken for a full area integration may be performed at fixed cam cycle locations such as for the pulses 708, 710 the integration of the waveforms at locations 728, 730, with the resultant sum of the integral slices taken for each pulse then being compared with each other pulse. With this less than full area integration the essential criteria is that the integration limits be the same for each pulse in order to provide a useful relative index.

Following subroutine 720, or 732 if used, subroutine 734 requests the determination of the relative manifold vacuum indications for each cylinder. Typically, this is provided as the ratio of each cylinder's integral value to the average integral value measured for all cylinders. The relative manifold vacuum indices for each cylinder are then stored, or displayed, or both after which the CPU exits the program at 698. The typical format for each cylinder are then stored, or displayed, or both after which the CPU exits the program at 698. The typical format for displaying the relative manifold vacuum indices, as illustrated in Table I for an engine having P number of cylinders.

TABLE I

| CYL # | 1 | 2 | ...... P |
|---|---|---|---|
| INT VAL | $K_1$ | $K_2$ | ...... $K_p$ |
| RMV | $\dfrac{K_1}{K_a}$ | $\dfrac{K_2}{K_a}$ | ...... $\dfrac{K_p}{K_a}$ |

Each integral summation of the particular cylinder's contribution to the fluctuation in sub-cyclic manifold vacuum is listed as integral summations $K_1$ through $K_p$, and the relative manifold vacuum contribution of each cylinder is listed as the ratio of each individual cylinder integral sum divided by the average integral value ($K_a$) for the P cylinder integrals. Typically, the relative manifold vacuum indication obtained for each cylinder may be read as a percentage value with a tolerance established for the acceptable performance being defined as a percentage of relative vacuum.

The relative manifold vacuum test of the present invention provides a quantitative measurement standard by which engine performance may be measured, particularly the integrity of the air induction system. By measuring and comparing each cylinder's contribution to the sub-cyclic fluctuations in the instantaneous manifold vacuum subtle imbalances in cylinder performance may be detected. The test procedure may be used on any type of IC engine for providing automatic test and pass-/fail criteria for extra-vehicular testing of engine, such as under hot-test. Similarly, although the invention has been shown and described with respect to a best mode embodiment thereof, it should be understood by those skilled in the art that the foregoing and various other changes, omissions and additions in the form and detail thereof may be made therein without departing from the spirit and scope of this invention.

We claim:

1. Apparatus for measuring the relative manifold vacuum contribution between cylinders of an internal combustion (IC) engine connected through its crankshaft to the drive shaft of an engine load and running at a selected speed, comprising:

position sensing means, adapted to be disposed along the drive shaft for providing crankshaft position signals indicative of the instantaneous angular position of the engine crankshaft at successive angle intervals within the engine cycle, each angle interval being less than that associated with a cylinder sub-cycle;

manifold vacuum sensing means, adapted to be disposed on the engine for providing signals indicative of the actual engine manifold vacuum; and signal processing means, responsive to said crankshaft position signals and said actual engine manifold vacuum signals and having memory means for storing signals including signals definitive of the engine cycle, for sampling and storing in said memory means, successive values of said actual manifold vacuum signals in response to the presense of each of said crankshaft position signals, to provide an indication of the sub-cyclic fluctuations in manifold vacuum over at least one engine cycle, and for comparing the magnitudes of each of said sub-cyclic fluctuations occurring in a common engine cycle with each other to provide signal indications of the relative manifold vacuum contribution between cylinders.

2. The apparatus of claim 1, further comprising:

crankshaft index sensor means, adapted for disposal on the engine, for providing in each engine cycle a crankshaft synchronization signal definitive of the occurrence of a selected engine cycle event; and wherein said signal processing means is further responsive to said synchronization signal, for providing signals indicative of the crankshaft angle intervals associated with each cylinder intake stroke in each engine cycle, and for identifying each of said sub-cyclic fluctuations in manifold vacuum as being associated with a particular one of said cylinder intake stroke angle intervals to provide identification of each of said subcyclic fluctuations in vacuum with an associated one of the cylinders, whereby said signal indications of relative manifold vacuum contribution is provided for each identified cylinder.

3. The apparatus of claim 1, wherein said processing means provides each of said signal indications of relative manifold vacuum as the ratio of the magnitude of each of said sub-cyclic fluctuations in vacuum to the average magnitude of all of said fluctuations in a common engine cycle.

4. The apparatus of claim 1, wherein said crankshaft position signals define equal value crankshaft angle intervals therebetween.

5. The method of measuring the relative manifold vacuum contribution between cylinders of an internal combustion engine connected through its crankshaft to the driveshaft of an engine load and running at a selected speed, comprising the steps of:
sensing the instantaneous angular position of the drive shaft to provide crankshaft position signals manifesting the instantaneous position of the engine crankshaft at successive angle intervals within the engine cycle, each angle interval being less than that associated with a cylinder sub-cycle;
measuring the actual value of the engine manifold vacuum in the presence of each crankshaft position signal to provide an indication of the sub-cyclic fluctuations in vacuum magnitude as they occur over an engine cycle; and
comparing the magnitudes of each of said sub-cyclic fluctuations occurring in a common engine cycle with each other to provide indications of the relative manifold vacuum contribution between cylinders.

6. The method of claim 5, further comprising the steps of:
sensing a crankshaft index to provide a synchronization signal definitive of the occurrence in each engine cycle of a known engine cycle event,
determining from said synchronization signal and said crankshaft position signals the crankshaft angle intervals associated with each cylinder intake stroke, and
identifying each of said sub-cyclic fluctuations in manifold vacuum as being associated with a particular intake stroke to provide identification of each of said fluctuations with an associated one of the cylinders, whereby said indications of relative manifold vacuum are provided for each identified cylinder.

7. The method of claim 5, wherein the step of identifying includes providing said indications of relative manifold vacuum contribution as the ratio of the magnitude of each of said sub-cyclic fluctuations in manifold vacuum to the averagee magnitude of all of said fluctuations in a common engine cycle.

* * * * *